(12) United States Patent
Lim

(10) Patent No.: US 8,886,185 B2
(45) Date of Patent: Nov. 11, 2014

(54) METHOD FOR PERFORMING HANDOVER OR INITIAL ACCESSING

(75) Inventor: Jaewon Lim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 218 days.

(21) Appl. No.: 13/521,027

(22) PCT Filed: Sep. 28, 2010

(86) PCT No.: PCT/KR2010/006594
§ 371 (c)(1),
(2), (4) Date: Dec. 4, 2012

(87) PCT Pub. No.: WO2011/111916
PCT Pub. Date: Sep. 15, 2011

(65) Prior Publication Data
US 2013/0090116 A1    Apr. 11, 2013

Related U.S. Application Data

(60) Provisional application No. 61/313,136, filed on Mar. 12, 2010.

(30) Foreign Application Priority Data

May 25, 2010    (KR) .......................... 10-2010-0048758

(51) Int. Cl.
*H04W 4/00*    (2009.01)
*H04W 48/08*    (2009.01)
*H04W 48/12*    (2009.01)
*H04W 36/00*    (2009.01)
*H04W 48/14*    (2009.01)

(52) U.S. Cl.
CPC .......... *H04W 36/0083* (2013.01); *H04W 48/08* (2013.01); *H04W 36/0055* (2013.01); *H04W 48/12* (2013.01); *H04W 48/14* (2013.01)
USPC ........................................................ 455/434

(58) Field of Classification Search
USPC .............. 455/434, 432.1, 436–444, 524–525; 370/331
See application file for complete search history.

(56) References Cited

U.S. PATENT DOCUMENTS

2010/0142489 A1*    6/2010    Qi ................................ 370/332

FOREIGN PATENT DOCUMENTS

| KR | 20100005374 | 1/2010 |
| KR | 20100018309 | 2/2010 |
| KR | 20100026914 | 3/2010 |
| KR | 20100026919 | 3/2010 |

\* cited by examiner

*Primary Examiner* — Brandon Miller
(74) *Attorney, Agent, or Firm* — Lee, Hong, Degerman, Kang & Waimey

(57) ABSTRACT

A method for performing handover or initial accessing by a terminal includes: receiving a message including one or more of information regarding a smart meter and information regarding neighbor base stations (BSs) connected to the smart meter, the smart meter having a function for managing power, determining at least one of the neighbor BSs connected to the smart meter as a BS to be accessed; transmitting an access request message for accessing the determined BS to the smart meter, and accessing the determined BS if a response message is received from the smart meter.

13 Claims, 6 Drawing Sheets

METHOD FOR PERFORMING HANDOVER OR INITIAL ACCESSING

CROSS-REFERENCE TO RELATED APPLICATIONS

This application is the National Stage filing under 35 U.S.C. 371 of International Application No. PCT/KR2010/006594, filed on Sep. 28, 2010, which claims the benefit of earlier filing date and right of priority to Korean Application No. 10-2010-0048758, filed on May 25, 2010, and also claims the benefit of U.S. Provisional Application Ser. No. 61/313,136, filed on Mar. 12, 2010, the contents of which are all incorporated by reference herein in their entirety.

TECHNICAL FIELD

The present invention relates to a mobile communication system and, more particularly, to a femto base station in a mobile communication system.

BACKGROUND ART $2^{nd}$ mobile communication refers to transmission and reception of voice through mobile communication, which includes CMDA, GSM, and the like. GPRS, advancing from the GSM, has been proposed to provide a packet switched data service based on the GSM system.

$3^{rd}$ generation mobile communication allows for transmission and reception of image and data, as well as voice, and 3GPP (Third Generation Partnership Project) has developed a mobile communication system (IMT-2000) technique and adopts WCDMA as a radio access technology (RAT). The combination of the IMT-2000 technique and the radio access technology (RAT), e.g., WCDMA, is called a UMTS (Universal Mobile Telecommunication System). UTRAN is an acronym of UMTS Terrestrial Radio Access Network.

$3^{rd}$ generation mobile communication is evolving to 4th mobile communication.

The $4^{th}$ mobile communication technique includes a long-term evolution network (LTE) technique under standardization by 3GPP and an IEEE 802.16 technique under standardization by IEEE. The LTE uses a term of E-UTRAN (Evolved-UTRAN).

The $4^{th}$ mobile communication technique has introduced OFDM (Orthogonal Frequency Division Multiplexing)/OFDMA (Orthogonal Frequency Division Multiple Access). OFDM uses a plurality of orthogonal subcarriers. OFDM uses orthogonality between IFFT (Inverse Fast Fourier Transform( ) and FFT (Fast Fourier Transform). A transmitter performs IFFT on data and then transmits the same. A receiver performs FFT on received signal to restore the original data. The transmitter uses IFFT in order to combine a plurality of subcarriers and the receiver uses corresponding FFT in order to split the multiple subcarriers.

Meanwhile, in the $3^{rd}$ and $4^{th}$ mobile communication system, attempts for increasing cell capacity continue to support high capacity services such as multimedia contents, streaming, and the like, and bi-directional services.

In order to increase cell capacity, there has been an approach of using a high frequency band and reducing a cell radius. The use of a cell, such as a pico cell, or the like, having a small cell radius allows for the use of a higher frequency band than that used for the existing cellular system, having the advantages that more information can be delivered. However, because a larger number of base stations must be necessarily installed in the same area, much cost incurs.

Thus, recently, a femto cell has been proposed as one of approaches of increasing cell capacity by using small cells.

Femto cell refers to provision of a small-scale radio environment by installing a base station using small power in indoor spaces such as homes, offices, and the like. The femto cell is expected to improve an indoor service available area and increase capacity to thus enhance quality of service (QoS), and also expected to completely settle the next generation mobile communication system by providing data services.

For such a femto cell, standardization is ongoing in the name of Home eNodeB by 3GPP WCDMA and LTE group, and 3GPP2 is also actively studying femto cell.

Various structures as illustrated in FIGS. 1 and 2 have been proposed in order to implement such a femto cell in the existing mobile communication network.

First, FIG. 1 illustrates an example of a network structure based on femto cells according to the related art.

As shown in FIG. 1, a macro base station (M-BS) serving a wider area and a plurality of femto base stations (f-BSs) installed based on users.

The f-BSs are connected with a femto cell network controller (FNC) through the Internet so as to be under the control of the FNC, and provide services to users.

A terminal measures signals of neighboring cells and delivers the measured signal values to its f-BS, and the f-BS recognizes and administers the presence of neighboring cells based on the received signal values. Also, the f-BSs exchange information through a direct link or an indirect link through the FNC. The f-BSs and the M-BS transmit and receive information through the FNC, an RNC (Radio Network Controller) or through an MME (Mobility Management Entity) that controls the f-BSs in a mobile communication network.

FIG. 2 illustrates a handover process in the system illustrated in FIG. 1.

With reference to FIG. 2, the terminal 10 periodically measures signals of the neighbor BSs while communicating with the serving BS 21, and transmits the measurement results including a value of the strength of the measured signal to the serving BS 21. The serving BS 21 may be the foregoing macro BS or the femto BS.

The serving BS 21 determines a target BS as a BS having a signal strength suitable for the terminal 10 to perform handover, among neighbor BSs, based on the measurement results, and then, in order to make the terminal 10 perform handover to the determined target BS, the serving BS 21 transmits a handover (HO) request message. The HO request message includes the information required for the handover, e.g., a cell ID (serving cell, target cell) and context of the terminal, the reason for performing handover, information of a movement path of the terminal (UE history information). The context of the terminal includes security, QoS, a user priority level, and the like.

Upon receiving the handover request message, the target BS 22 transmits a HO Request Confirm message to the serving BS 21, to inform that whether or not handover is allowed. Upon receiving the HO Request Confirm message, the serving BS 21 forwards data traffic of the terminal to the target BS 22.

The serving BS 21, transmits a handover (HO) command message to the terminal 10 to command the terminal 10 to perform handover to the target BS 22. Upon receiving the HO command message, the terminal 10 performs a handover (HO) execution process to access the target BS 22.

Meanwhile, the serving BS 21 and the target BS 22 may be macro BSs or femto BSs. In case of handover performed between the macro BS and the femto BS, the foregoing messages are transmitted or received among the femto BS, the MME, and the serving BS through the general Internet, and in this case, the Internet cannot guarantee no delay of the messages nor guarantee QoS such that the messages have a higher transmission priority level, causing handover to be delayed.

As mentioned above, when the terminal performs handover to the target femto BS or newly access the target femto BS, delay may occur because the related messages are transmitted and received through the Internet.

DISCLOSURE OF INVENTION

Solution to Problem

The present invention has been made in view of the above-mentioned problem, and it is one object of the invention to quickly perform a handover operation or a new accessing operation by transmitting related messages without delay when a terminal performs handover or newly access a target femto base.

In other words, in order for the terminal to perform handover, the terminal must transfer mobility related information to a target femto BS, and upon receiving the corresponding information, the target femto BS must transfer information, which may allow the terminal to perform handover, to the terminal through a serving BS to which the terminal is currently connected.

Thus, an object of the present invention is to allow messages including such information to be rapidly transmitted and received, thus preventing delay in handover.

Meanwhile, in order to minimize interference with neighbor cells and power consumption, the femto BS may maintain a femto cell operation in an inactive state, without communicating with a terminal for a certain time period by using a sleep mode. In the sleep mode, the femto BS may not transmit communication data with the terminal, system information including operation information of a femto cell or the like, and a reference signal allowing the terminal to detect the femto BS for a certain time period or may transmit them in the interval of a long time period.

However, in the sleep mode, there is a problem in that it is difficult for the terminal to detect the femto BS. The reason is because, in order for the terminal to search the femto BS, the terminal must receive a reference signal from the femto Bs, but, the femto BS, operating in the sleep mode, does not transmit the reference signal or transmits the reference signal in the interval of a long time period, so the terminal is highly likely not to search the reference signal of the femto BS.

Thus, the present invention solve the mentioned problems by allowing the terminal to quickly perform handover to or newly access the femto BS operating even in the sleep mode.

To achieve the above objects, the present invention provides an architecture including an interface between a femto BS and a network of a smart grid. Also, in the present invention, handover-related information is transmitted through the interface between the network of the smart grid and the femto base station, thus preventing delay of handover or delay in initial accessing.

To achieve the above objects, in the present invention, an entity, e.g., a smart meter, within the network of the smart grid transmits the reference signal in place of the femto BS operating in the sleep mode, thus solving the problem caused as the femto BS does not transmit the reference signal because it operates in the sleep mode.

In detail, to achieve the above objects, the present invention provides a method for allowing a terminal to perform handover or initial accessing. The method for performing handover or initial accessing by a terminal may include: receiving a message including one or more of information regarding a smart meter and information regarding neighbor base stations (BSs) connected to the smart meter, the smart meter having a function for managing power; determining at least one of the neighbor BSs connected to the smart meter as a BS to be accessed; transmitting an access request message for accessing the determined BS to the smart meter; and accessing the determined BS if a response message is received from the smart meter.

The message may be received from the smart meter, the currently accessed serving BS, or a neighbor BS.

The message receiving operation may include transmitting a request message with respect to the message to the searched smart meter.

The access request message may be a handover request message, and the handover request message may include one or more of the ID of the terminal, information regarding the currently accessed BS, information regarding the determined BS, information regarding the reason of handover, and context information.

To achieve the above objects, there is provided a method for controlling, by a smart meter which administers power, accessing of a mobile terminal. The method for controlling, by a smart meter, accessing of a mobile terminal includes: transmitting a message including one or more of information regarding the smart meter and information regarding base stations (BSs) connected to the smart meter; receiving an access request message regarding a particular BS among the BSs from the terminal; transferring the access request message to the particular BS the BSs which are connected to the smart meter, and transferring the response message to the terminal if a response message is received from the particular BS.

The transferring of the access request message may include encapsulating the access request message according to a protocol between the smart meter and the particular BS.

The transferring of the message may include: receiving a request message with respect to the message; and transmitting the message in response to the reception of the request message.

The access request message may be a handover request message, and the handover request message may include one or more of the ID of the terminal, information regarding a BS the terminal has been currently accessed, information regarding the reason of handover, and context information.

To achieve the above objects, there is provided a terminal. The terminal may include a transceiver configured to receive a message including information regarding a smart meter and information regarding neighbor BSs connected to the smart meter; and a processor configured to determine at least one of BSs connected to the smart meter, as a BS to be accessed, based on the message, wherein the transceiver transmits an access request message for accessing the determined BS to the smart meter, and when a response message is received from the smart meter, the transceiver accesses the determined BS.

According to exemplary embodiments of the present invention, when the terminal performs handover to a target femto BS or when the terminal newly accesses the target femto BS, related messages can be transmitted without delay, so the handover operation or the new accessing operation can be rapidly performed.

In addition, the terminal can rapidly perform handover to or newly access a femto BS operating in a sleep mode.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
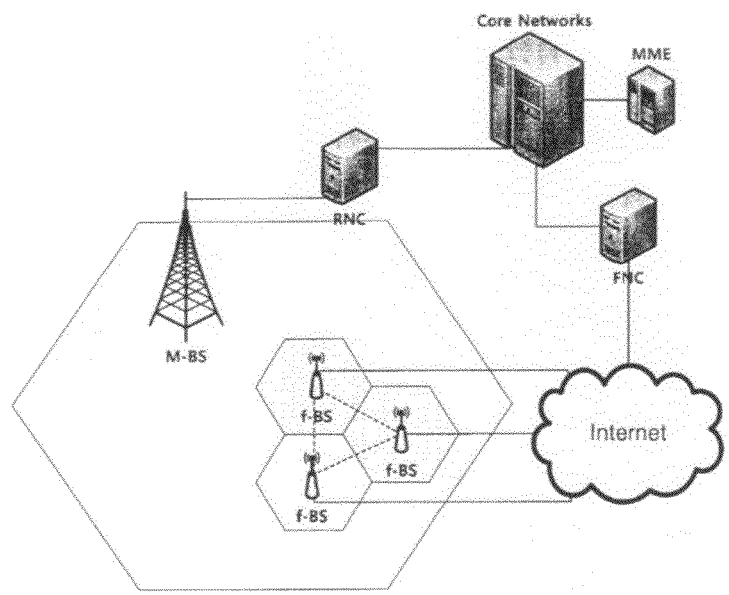
FIG. 1 is a view illustrating an example of a femto cell-based network architecture according to the related art.
Figure 2:
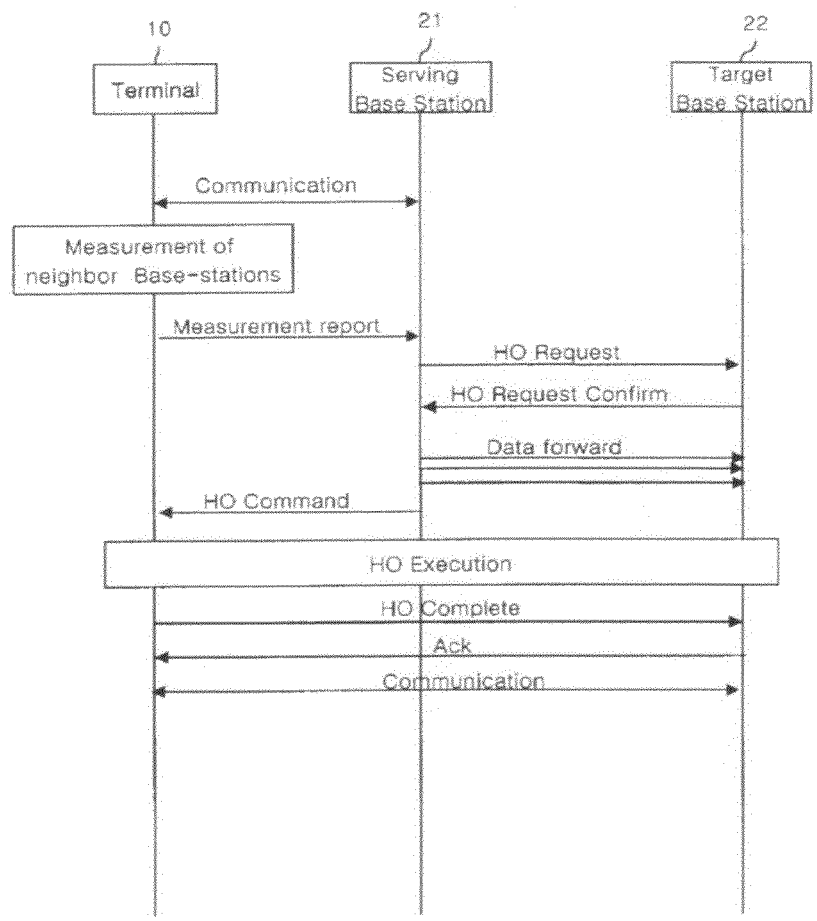
FIG. 2 is a view showing a handover process in the system illustrated in FIG. 1.

The present invention is applied to a femto base station (BS). However, without being limited thereto, the present invention can be also applicable to any communication system and method to which a technical idea of the present invention is applicable.

The present invention may be embodied in many different forms and may have various embodiments, of which particular ones will be illustrated in drawings and will be described in detail. However, it should be understood that the following exemplifying description of the invention is not meant to restrict the invention to specific forms of the present invention but rather the present invention is meant to cover all modifications, similarities and alternatives which are included in the spirit and scope of the present invention. The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected with" another element, it can be directly connected with the other element or intervening elements may also be present. In contrast, when an element is referred to as being "directly connected with" another element, there are no intervening elements present.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The terms used in the following description of the present invention will now be explained before describing the exemplary embodiments of the present invention.

In the following description, a terminal is used, but the terminal may be also referred to as a term such as user equipment (UE), mobile equipment (ME), mobile station (MS), or the like. Also, the UE may be a portable device such as a notebook computer, a mobile phone, a PDA, a smartphone, a notebook computer, and the like, or a non-portable device such as a PC or a vehicle-mounted device.

In the following description, a term called femto base station is used, which may be also called a home (e)NodeB.

The present invention will now be described in detail with reference to the accompanying drawings.

Figure 3:
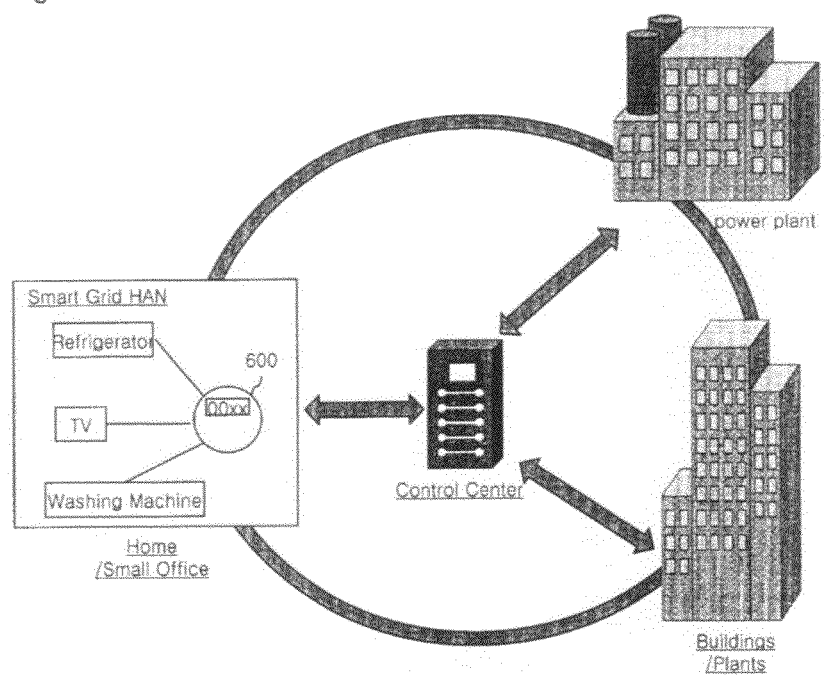
FIG. 3 is a conceptual view of a smart grid which has been newly proposed recently.

FIG. 3 is a conceptual view of a smart grid which has been newly proposed recently.

The smart grid refers to a next-generation power network obtained by grafting IT technologies onto the existing power network, e.g., a power plant, power transmission plant, a (power) transmission site, a power consumption and the like, in order to exchange information in real time between a power supplier and a consumer to thus optimize an energy efficiency. Thus, the efficiency can be improved as the power supplier and the consumer interact.

In order to understand the smart grid, the current power system must be first understood. Electricity in use is designed to be produced by 10 percent or larger than the actual usage amount. This is to secure electricity adjusted in advance as a maximum consumption just in case electricity is used more than expected. Various generation facilities, as well as fuel, are additionally required. However, a great deal of electricity is also wasted, degrading energy efficiency, and carbon dioxide is increasingly discharged in the process of burning coal, petroleum, gas, and the like.

Thus, if electricity is produced as much as required or if electricity is used according to the production, electricity could be more effectively used while global warming is prevented. To achieve this, the smart grid technique has been proposed by converging an IT technology into a power network, which allows the usage amount and supply amount of electricity and a status of a power line to be known.

The use of the smart grid technique allows the consumers to use electricity at a lower cost and enables electronic products to be operated during a time slot in which electricity cost is relatively low.

At the position of a power producer, the power producer can recognize the status of power usage in real time, so it can elastically adjust the power supply. Because a maximum amount of power does not need to be maintained at a time slot during which power usage is low, wasted electricity can be reduced, and electricity can be elastically operated such that it is stored and then supplied during a time slot in which a great deal of power is used. Also, breakdown of the power network resulting from overload can be prevented.

A smart meter 600, one of network elements of the smart grid, is a device as a point discriminating a supplier and a user, which performs administration, monitoring, and controlling with respect to an energy supply and demand of users.

The function of the smart meter 600 may include electricity reading, demand response commands, pricing information, connection/disconnection commands, an the like. The smart meter 600 may be connected to home devices, for example, a refrigerator, a TV, a washing machine, and the like, to constitute a home area network 9HAN). Also, the smart meter 600 may use ZigBee™, WiFi, and the like, as a wireless communication scheme in order to be connected with internal devices of the HAN, and may use power line communication (PLC), and the like, as a wireline communication scheme.

The smart meter 600 may perform bi-directional communication with a supplier or smart meters through a smart grid network.

Figure 4:
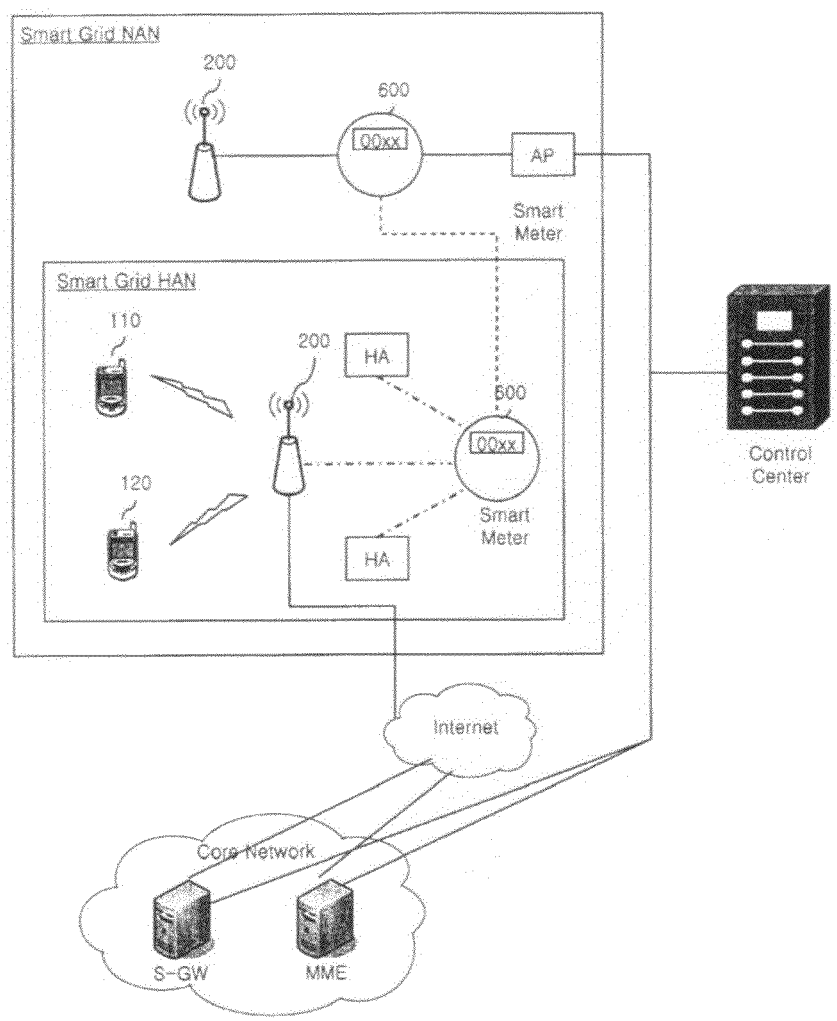
FIG. 4 is a view showing an architecture in which a femto BS and a smart grid are combined.

FIG. 4 is a view showing an architecture in which a femto BS and a smart grid are combined.

As shown in FIG. 4, one or more smart meters 600 are connected with home appliances (HAs) such as, for example, a refrigerator, a washing machine, a TV, and the like, and also connected with one or more femto BSs 200.

The smart meters 600 support short-range communication, e.g., WiFi, Bluetooth™, wireless USB, USN, and the like. Also, the terminal 100 support the short-range communication, e.g., WiFi, Bluetooth™, wireless USB, USN, and the like, as well as cellular communication. Thus, the smart meters 600 and the terminal 100 can communicate with each other.

The femto BSs support two or more interfaces. Namely, the femto BSs 200 support a first interface with the terminal 100 and a second interface with the smart meter 600 or the terminal 100. Also, the femto BSs 200 support a third interface connected with the Internet.

In detail, the first interface of the femto BS 200 may be, for example, GSM, CDMA, LTTE, IEEE 802.16, ZigBee™, WiFi, Bluetooth™, and the like.

The second interface of the femto BS 200 may be ZigBee™, WiFi, PLC, Bluetooth™, USN, and the like. Through such connection, the femto BS 200 may exchange control information with the smart meter 600. Also, through the connection with the smart meter 600, the femto BS 200 may access the smart grid network.

The third interface of the femto BS 200 may allow the femto BS 200 to be connected to a mobile communication core network through the Internet. The mobile communication core network includes a serving gateway (S-GW) and an MME (mobility Management Entity). Thus, the smart meter 600 may perform communication with a mobile communication network through the femto BS 200.

The smart meter 600, the HA, the femto BS 200 may be connected to constitute a smart grid HAN (Home Area Network).

Meanwhile, the smart meters 600 are connected to a control center (e.g., a smart grid operation/control center) through an AP (Access Point) so as to be controlled.

Also, the smart meters 600 are connected to each other to constitute a neighborhood area network (NAN). Through such an NAN, a distribution automation and advanced metering interface (AMI) function can be performed, and an intelligent energy supply may be made to the HAN.

Connection techniques between the smart meters 600 may include WiMAX, 3GPP LTE, RF mesh techniques as wireless techniques, and include PLC, an optical cable, a coaxial cable, and the like. When the smart meters 600 are connected through a long range communication scheme such as 3GPP LTE, WiMAX, and the like, a reliable connection can be established therebetween in terms of a distribution automation, and the smart meters 600 can be quickly connected.

Figure 5:
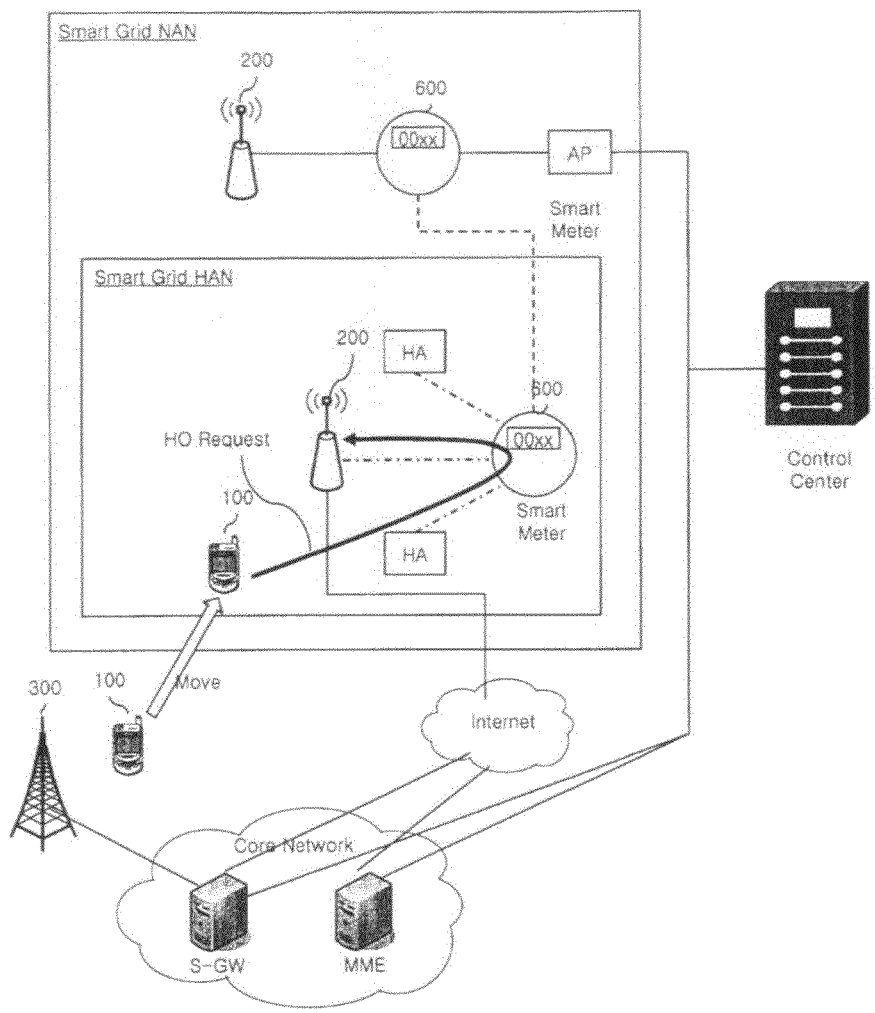
FIG. 5 is a conceptual view of handover or initial accessing process without delay through the architecture illustrated in FIG. 4.

FIG. 5 is a conceptual view of handover or initial accessing process without delay through the architecture illustrated in FIG. 4.

As shown in FIG. 5, although the femto BS 200 is operating in a sleep mode in which it does not transmit a reference signal to the terminal 100, the interface between the femto BS 200 and the smart meter 600 is maintained in an activated state. And, the smart meter 600 and the terminal 100 support the short-range communication, e.g., WiFi, Bluetooth™, wireless USB, and USN, the terminal 100 can communicate with the femto BS 600 through the short-range communication with the smart meter 600 although the femto BS 200 is operating in the sleep mode.

Thus, when the terminal 100 wants to perform handover to the femto BS 200 operating in the sleep mode from a macro BS 300 as illustrated, the terminal 100 transmits the handover-related information to the smart meter 600 and the smart meter 600 transfers the handover-related information to the femto BS 200, thus performing handover.

Figure 6:
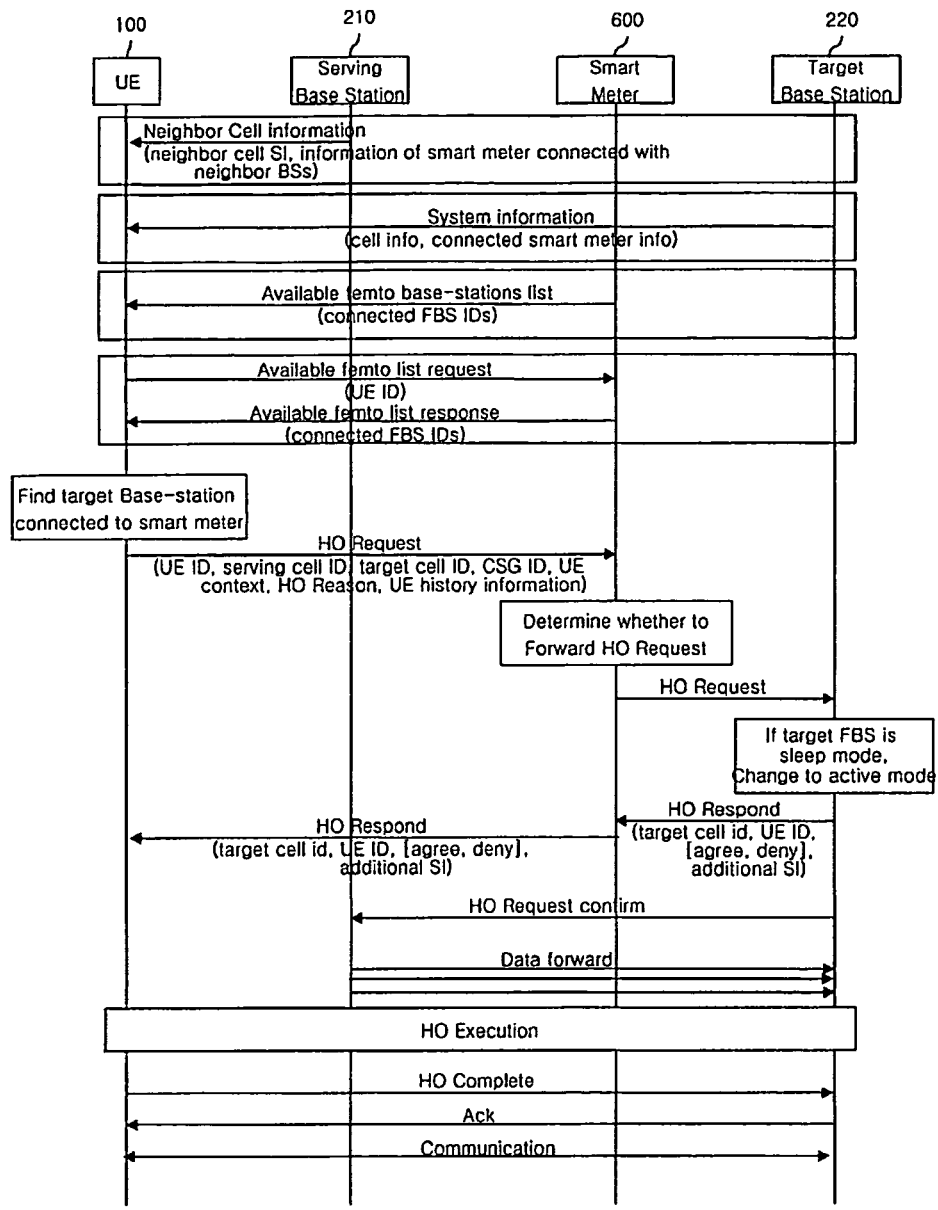
FIG. 6 is a flow chart illustrating in detail the concept illustrated in FIG. 5.

FIG. 6 is a flow chart illustrating in detail the concept illustrated in FIG. 5.

As shown in FIG. 6, when the terminal wants to perform handover to the femto BS 200 operating in the sleep mode from the macro BS 300, it transmits the handover-related information to the smart meter 600 and the smart meter 600 transfers the handover-related information to the femto BS 200, whereby the terminal 100 can perform handover although the femto BS is operating in the sleep mode. Also, when the handover-related information is transmitted to the smart meter 600, the smart meter 600 delivers it to the MME within the mobile communication core network through the AP. Or, when the smart meter 600 supports WCDMA, 3GPP LTE, or WiMAX, the smart meter 600 may directly transfer the handover-related information to the MME within the mobile communication core network, whereby the handover-related information can be transmitted or received without delay.

This will now be described in detail.

1) The serving BS 210 includes ID of at least one neighbor femto BS around the serving femto BS 210 and the information regarding a neighbor smart meter 600 to which the neighbor fembo BS is connected in the system information (SI) to be transmitted to the terminal 100, and transmits the same.

2) Also, the serving femto BS 210 may include information regarding the smart meter 600 to which the target femto BS 220 is currently connected in neighbor cell information, which is periodically transmitted by the serving femto BS 210, and transmit the same. The information regarding the smart meter may include the id of the smart meter 600 and information regarding a radio access technology (RAT) supported by the smart meter 600.

Alternatively, the target femto BS 220 may include information regarding the smart meter 600 to which the target femto 220 is connected in system information, along with cell information, and transmit the same.

Alternatively, the smart meter 600 may transmit information of a list of femto BSs to which the smart meter 600 is connected, to the terminal 100. The list information may include information regarding the smart meter and information regarding neighbor BSs, e.g., IDs of the neighbor BSs, connected to the smart meter and system information. The list information may also include information regarding radio access technologies supported by the femto BSs. This scheme may be useful when the femto target BS 220, operating in the sleep mode, does not transmit the foregoing system information or transmits the system information in the interval of a long time period.

Alternatively, the terminal 100 may periodically search the smart meter 600 wirelessly, transmit a message requesting a list of available femto BSs, e.g., an available femto BS list request message, to the searched smart meter 600, and receive a femto BS list response message, e.g., an available femto BS list response message, from the smart meter 600. The femto BS list request message may include the ID of the terminal. The femto BS list response message may include information, e.g., the IDs, of the femto BSs available for connection and system information.

Because there is a delay time for the terminal 100 to receive the response after the request, it can be selectively used when the terminal 100 needs to rapidly search a different BS to be accessed such as when communication quality with a BS currently accessed by the terminal 100 or when the terminal 100 performs an initial network entry process.

2) The terminal determines whether or not there is a femto BS to which the terminal is to perform handover, based on the system information or the neighbor cell information from the serving BS 210. Or, the terminal 100 performs the determination based on the system information from the target femto BS 220. Or, the terminal 100 may perform the determination based on the femto BS list information or the femto BS list response message from the smart meter 600.

When it is determined that there is a target femto BS to which the terminal performs handover, the terminal 100 checks whether or not there is at least one smart meter 600 connected to the target femto BS based on at least one of the information.

When it is checked that the smart meter 600 exists based on the information, the terminal 100 searches the smart meter 600 wirelessly. For example, the searching may be performed through a wireless scheme such as ZigBee™, WiFi, and the like.

3) The terminal 100 transmits a handover (HO) request message including handover-related information of the terminal to the smart meter 600 connected to the target femto BS 220 to which the terminal 100 is to perform handover. The handover request message may be encapsulated with a protocol based on an interface between the terminal 100 and the smart meter 600, e.g., short-range radio communication, e.g., WiFi, Bluetooth™. ZigBee™, wireless USB, USN, and the like, and then transmitted. The handover request message includes a UE ID, a cell ID (serving cell, target cell), a CSG ID, context information of the terminal, the reason for performing HO (HO reason), information regarding a movement path of the terminal (UE history information), and the like. The context information may include security, QoS, a user priority level, and the like. The UE history information may include a list of cell IDs through which the terminal has been moved.

4) When the smart meter 600 receives the handover request message, it transfers the received handover request message to the target femto BS 220 currently connected to the smart meter 600. In this case, the smart meter 600 checks the handover request message, and only when the target femto BS is connected to the smart meter 600, the smart meter 60 may transmit the handover request message to the target femto BS 220. When the smart meter 600 cannot read the handover request message, it transmits the handover request message to every femto BS connected to the smart meter 600. The transmission may be made through the foregoing second interface between the smart meter 60 and the target femto BS 220. To this end, the smart meter 600 may decapsulate the encapsulated handover request message, check an ID of the target BS, encapsulates the same according to a protocol based on the second interface and then transmits the encapsulated handover request message to the target BS. Alternatively, the smart meter 600 encapsulates the handover request message, which was encapsulated according to a protocol based on an interface between the terminal and the smart meter, according to a protocol based on a second interface with the connected femto BS and transmits it to all the femto BSs connected with itself. The handover request message may be decapsulated by the femto BS connected to the smart meter.

5) The target femto BS 220 checks whether or not the target cell within the handover request message is the target femto BS 220 itself. When the target femto BS 220 checks that the handover request message is aimed for the target femto BS 220 itself, the target femto BS 220 checks a CSG ID included in the handover request message to determine whether or not terminal accessing is allowed. When terminal accessing is allowed, the target femto BS 220 changes the sleep mode state to an activation mode state.

The femto BS 220 transmits a handover response message to the smart meter 600. In this case, the femto BS 220 may encapsulates the handover response message according to the protocol based on the second interface and transmit the same.

Then, the smart meter 660 transfers the handover response message to the terminal.

In this case, the smart meter 600 may decapsulate the encapsulated handover response message, encapsulate the decapsulated message according to the protocol based on the interface with the terminal, and transmit the same. The handover response message may include a target cell ID, UE ID, whether or not handover is agreed or denied, system information of an additional femto cell.

The target femto BS 220 transmits a handover request confirmation message to the serving BS 210.

The serving BS 210 forwards the data for the terminal 100 it has retained to the target femto BS 220.

6) The terminal 100 performs handover.

The above-described processes have been described based on handover, but the present invention can be applicable even to a case in which the terminal 100 initially accesses the target femto BS 220.

The difference in the initial accessing process is that, because there is no serving BS the terminal 100 has currently accessed, the terminal 100 does not receive an instruction from any serving BS and exchanges information required for terminal's accessing, with the target BS via the smart meter connected to the target BS. In this case, in order to transfer information required for the terminal's accessing, to the target femto BS, a procedure such as a ranging process is performed. Also, the target femto BS, which has received information on the terminal, could not receive service information of the terminal via serving BS, differently from a handover procedure.

Meanwhile, after the target femto BS 200 and the terminal 100 exchange the information required for the terminal's accessing, the initial network entry process is optimized to thus shorten time required for the initial network entry.

The methods according to the present invention described thus far can be implemented as software, hardware or their combination. For example, the method according to the present invention may be stored in a storage medium (e.g., an internal memory, a flash memory, a hard disk, and the like), and may be implemented as codes or commands in a software program that can be executed by a processor (e.g., a microprocessor). This will now be described with reference to FIG. 7.

Figure 7:
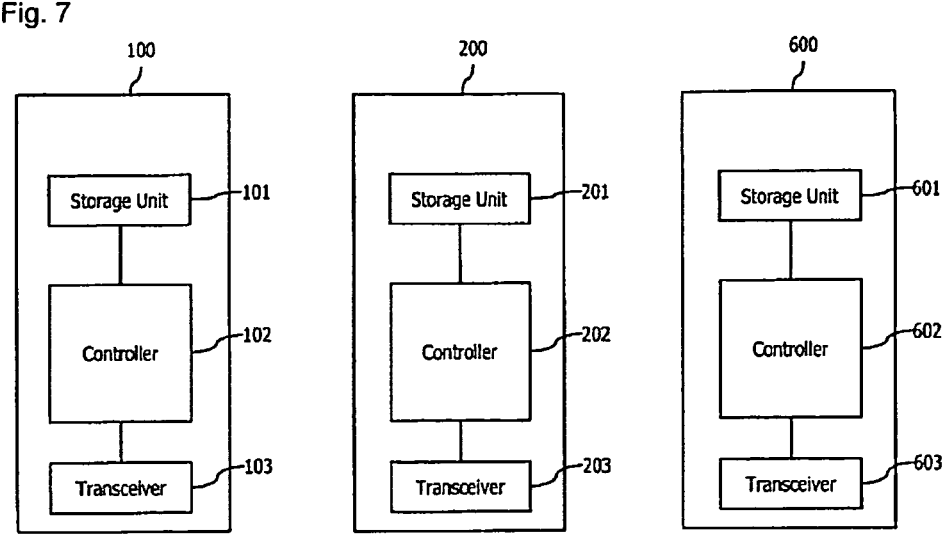
FIG. 7 is a schematic block diagram of a terminal 100, a femto BS 200, and a smart grid 600 according to an exemplary embodiment of the present invention.

FIG. 7 is a schematic block diagram of the terminal 100, the femto BS 200, and the smart grid 600 according to an exemplary embodiment of the present invention.

As shown in FIG. 7, the terminal 100 includes a storage unit 101, a controller 102, and a transceiver 103. The femto BS 200 includes a storage unit 201, a controller 202, and a transceiver 203. The smart grid 600 includes a storage unit 601, a controller 602, and a transceiver 603.

The storage units 102, 202, and 602 store the methods illustrated in FIGS. 3 to 6.

The controllers 102, 202, and 602 control the storage units 101, 201, and 602 and the transceivers 103, 203, and 603. In detail, the controllers 102, 202, and 602 execute the methods stored in the storage units 101, 201, and 602. The controllers 102, 202, and 602 transmit the foregoing signals through the transceivers 103, 203, and 603.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A method for performing handover or initial accessing, the method performed by a terminal and comprising:
   receiving, by the terminal, a message including one or more of information regarding a smart meter and information regarding neighbor base stations (BSs) connected to the smart meter, the smart meter having a function for managing power;
   determining, by the terminal, at least one of the neighbor BSs connected to the smart meter as a BS to be accessed;
   transmitting, by the terminal, an access request message for accessing the determined BS to the smart meter; and
   accessing, by the terminal, the determined BS if a response message is received from the smart meter.

2. The method of claim 1, wherein the message is received from the smart meter, the currently accessed serving BS, or a neighbor BS.

3. The method of claim 1, wherein the message is a neighbor cell information message received from the currently accessed serving BS or a system information message received from a neighbor BS.

4. The method of claim 1, wherein the receiving of the message comprises:
   searching the smart meter; and
   transmitting a request message with respect to the message to the searched smart meter.

5. The method of claim 1, wherein the access request message is a handover request message, and the handover request message comprises one or more of the ID of the terminal, information regarding the currently accessed BS, information regarding the determined BS, information regarding the reason of handover, and context information.

6. A method for controlling, by a smart meter which administers power, accessing of a mobile terminal, the method comprising:
   transmitting a message including one or more of information regarding the smart meter and information regarding base stations (BSs) connected to the smart meter;
   receiving an access request message regarding a particular BS among the BSs from the terminal;
   transferring the access request message to the particular BS or the BSs which are connected to the smart meter; and
   transferring the response message to the terminal if the response message is received from the particular BS or the BSs.

7. The method of claim 6, wherein the transferring of the access request message comprises:
   encapsulating the access request message according to a protocol between the smart meter and the particular BS.

8. The method of claim 6, wherein the transferring of the response message comprises:
   receiving a request message with respect to the response message; and
   transmitting the response message in response to the reception of the request message.

9. The method of claim 6, wherein the access request message is a handover request message, and the handover request message comprises one or more of the TD of the terminal, information regarding a BS the terminal has been currently accessed, information regarding the reason of handover, and context information.

10. A terminal comprising:
    a transceiver configured to receive a message including information regarding a smart meter and information regarding neighbor BSs connected to the smart meter; and
    a processor configured to determine at least one of BSs connected to the smart meter, as a BS to be accessed, based on the message, wherein the transceiver transmits an access request message for accessing the determined BS to the smart meter, and when a response message is received from the smart meter, the transceiver accesses the determined BS.

11. The terminal of claim 10, wherein the message is received from the smart meter, the currently accessed serving BS, or a neighbor BS.

12. The terminal of claim 10, wherein the message is a neighbor cell information message received from the currently accessed serving BS or a system information message received from a neighbor BS.

13. The terminal of claim 10, wherein the access request message is a handover request message, and the handover request message comprises one or more of the ID of the terminal, information regarding the currently accessed BS, information regarding the determined BS, information regarding the reason of handover, and context information.

* * * * *